United States Patent [19]

Hattan

[11] Patent Number: 4,835,559
[45] Date of Patent: May 30, 1989

[54] BOX CAMERA

[76] Inventor: Mark Hattan, 707 E. Tularosa Ave., Orange, Calif. 92666

[21] Appl. No.: 165,168

[22] Filed: Mar. 7, 1988

[51] Int. Cl.⁴ .......................... G03B 3/00; G03B 17/12
[52] U.S. Cl. ................................. 354/195.1; 354/288
[58] Field of Search .............................. 354/195.1, 288

[56] References Cited

U.S. PATENT DOCUMENTS

| 751,116 | 2/1904 | Stark | 354/195.1 |
| 983,047 | 1/1911 | Grant | 354/195.1 |
| 1,642,651 | 9/1927 | Gaibel | 354/195.1 |

Primary Examiner—Michael L. Gellner
Attorney, Agent, or Firm—Plante, Strauss & Vanderburgh

[57] ABSTRACT

The present invention relates to a box camera which comprises a rectangular body which is open at two opposite sides to define a housing which is formed of a completely dimensionally stable fiber reinforced thermosetting resin. A lens plate assembly including a lens mounting plate and lens mounting plate support frame is slidably carried by the housing. The lens mounting plate is supported about its periphery by the support frame and the camera lens and shutter assembly is carried by the lens plate thus providing a highly stable lens mount. The housing adjacent the opposite one side is adapted for removably receiving a back member which closes the opposite side of the housing. The back member comprises a film plate which carries film sheets for exposure or which may carry means for mounting a film cassette and may also comprise a viewing device by which one may view the images received by the camera for composing and framing pictures. Light seal means are provided about the back member for providing a light seal between the back member and the interior of the housing.

27 Claims, 6 Drawing Sheets

BOX CAMERA

FIELD OF THE INVENTION

This invention relates to box cameras and in particular to a light weight, dimensionally stable box camera suitable for photogrammetric photography.

BACKGROUND OF THE INVENTION

Photogrammetry is the science of obtaining accurate information about an object by recording and measuring photographic images of the object. Included within the definition of photogrammetry is the process of making surveys and maps through the use of photographs. Normally, aerial photography is employed for this purpose thus making it possible to survey and map large areas with a minimum of time and effort. Photogrammetry is particularly useful in the mapping of remote areas of limited accessibility.

The camera equipment utilized for photogrammetric purposes must be of rugged construction and must be relatively simple to operate. The images being photographed are normally at infinity, so that depth of field and focusing are not a primary problem in photogrammetric and aerial photography. Since any distortion in the image will introduce errors, photogrammetric cameras, which are normally box cameras, are equipped with very expensive lenses for maximum accuracy. As mentioned, the camera housing, mounting devices and the like must be relatively rugged in order to withstand the rigors of aerial photography and surveying.

Conventional view cameras comprise a housing which is normally rectangularly shaped and which has a rear face adapted for receiving a film holder. The front wall of the camera housing may be hinged for movement between a closed position with the lens received in a protected position in the camera housing and an open extended position with lens exposed. The lens is mounted by a lens board which is disposed within the housing and the inner surface of the front wall of the camera housing is provided with a track over which the lens board moves when the front wall is in the open position. A light tight seal between the lens board and the interior of the housing is provided by a collapsible bellows or similar device. Suitable drive means are provided for moving the lens board along the track to focus the lens. The shutter, shutter speed control mechanism, and aperture control mechanism may be built into the lens body or may be separate from the lens, as is well known in the art, and a shutter control mechanism such as a sheathed plunger mechanism extends through the housing for operating the shutter. For aerial photography, the lens focus, aperture and shutter speed are normally preset so that all that is necessary in the air is to change the film and operate the shutter control.

As previously mentioned, accuracy is of the highest importance in photogrammetric work and great care must be taken to factor in any inaccuracies due to the film and the lens. For this reason, very expensive and highly accurate lenses, usually certified for accuracy by the U. S. Bureau of Standards or other qualified agency, are employed in photogrammetric cameras. Processing of the exposed film is done with great care, even to the point of transferring the negative from film to a positive on glass plates in order to avoid any further inaccuracy which might be caused if the negative were transferred to plastic sheet or paper materials such as is the case with ordinary photographs.

In addition to errors induced by the lens and the film, another source of inaccuracy in photogrammetric work, which cannot be compensated for or factored in, is due to the camera body itself. Commercially available camera bodies can produce inaccuracies due to the many dimensional tolerances which are inherent in the design and manufacture of the camera body and which would be of no consequence in normal photography. In addition, inaccuracies are generated when a conventional camera body is exposed to variations in temperature, such as may be encountered in aerial photography. For example, if the lens position is set in the camera at room temperature, such as is normal practice, at low temperatures sufficient dimensional changes in the camera body will occur to induce errors in the photographs which cannot be compensated for in normal practice. Yet another cause of inaccuracy is due to lens buffeting when the photographs are taken from aircraft.

To overcome the aforementioned problems, camera bodies designed especially for photogrammetric purposes are available. Such camera bodies are constructed of heavy, materials which can withstand the handling, wind buffeting and the other factors encountered with aerial photography. Such camera bodies are, however, useful for a single purpose only, are heavy and are very expensive.

SUMMARY OF THE INVENTION

The present invention relates to a box camera suited for photogrammetric use which can be manufactured to very close tolerances and which is relatively inexpensive, rugged, light-weight, simple to use and readily adaptable for ordinary aerial photography, outdoor work and the like. The camera comprises a body which is open at two opposite sides to define a housing which is formed of a completely dimensionally stable fiber reinforced thermosetting resin. One open side of the housing receives a lens mount including a lens mounting plate and lens mounting plate support frame which is slidably carried by the housing. The lens mounting plate is supported about its periphery by the support frame and the camera lens and shutter assembly is carried by the lens plate thus providing a highly stable lens mount.

The housing adjacent the opposite open side is adapted for removably receiving a back member which closes the opposite side of the housing. The back member may comprise a viewing device by which one may view the images received by the camera for composing and framing pictures. The back member may also comprise a film plate which carries film sheets for exposure or which may carry means for mounting a film cassette and means for advancing the film after it is exposed. Light seal means are provided about the back member for providing a light seal between the back member and the interior of the housing.

The camera housing is constructed from fiber reinforced thermosetting resin and is preferably formed by laying up layers of the fiber reinforced resin in a suitable mold. Fiber reinforced resin is very light weight and extremely high strength and importantly is dimensionally stable so that it is completely unaffected by temperature change at the temperature ranges normally encountered in photogrammetric and aerial work and is subject to very small dimensional changes during the manufacturing process, which changes are predictable and are compensated for by adjusting the mold dimensions. Accordingly, the camera housing can be made to very close tolerances and the tolerances will be maintained throughout the life of the camera housing.

The resulting camera housing is light weight, rugged and extremely dimensionally stable. Once positioned in the housing, the lens position with respect to the film undergoes essentially no change as the camera is subjected to varying temperatures. In addition, the lens board, being supported about its entire periphery, is stable and is resistant to buffeting when utilized in aerial photography. Images made with the camera of the present invention are therefor essentially free of random distortion due to dimensional changes or random changes in lens orientation. The primary distortion factor [which is readily compensated for] is due to the lens itself. Since this distortion factor is not random [and is readily compensated for] the camera of the present invention permits the use of less expensive lenses, even though their distortion factor may be higher, since the distortion can be readily compensated for and since the aforementioned random distortion factors, introduced by conventional camera bodies, are essentially eliminated. In addition, however, the camera of the present invention is sufficiently flexible and adaptable for general camera use such as portrait use and outdoor landscapes. It is particularly ideal for outdoor landscapes since the camera housing and its component parts are light weight and extremely rugged.

These and other features of the present invention will be apparent from the detailed description and the drawings that follow.

DESCRIPTION OF THE INVENTION

Figure 1:
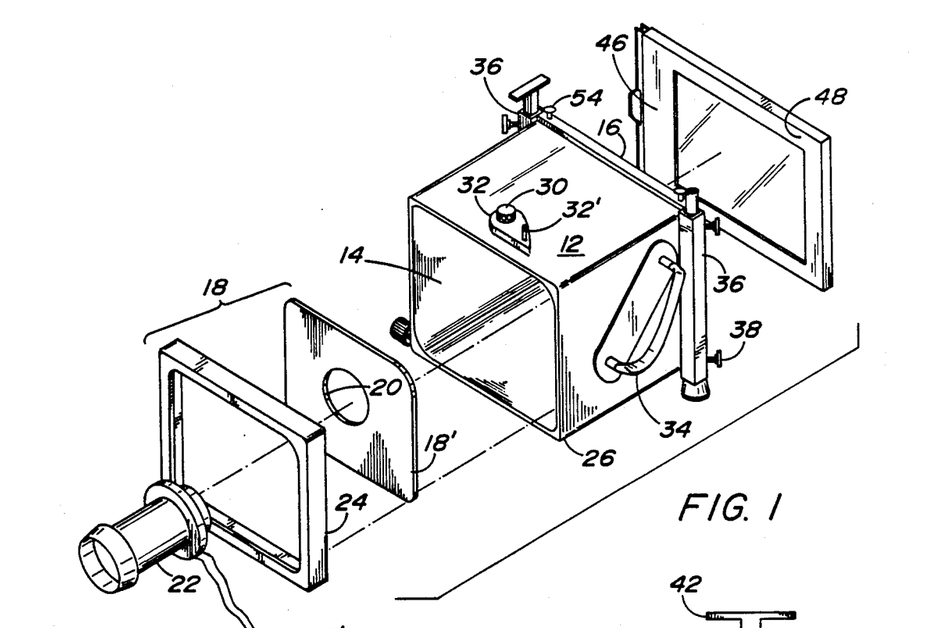
FIG. 1 is an exploded perspective view of the elements of one embodiment of the camera of the present invention.

Referring now to FIG. 1, the box camera of the present invention is illustrated in an exploded perspective view. The camera comprises an camera housing 12 which is formed of a dimensionally stable material. In the embodiment illustrated the camera housing 12 is box shaped body which is open at its front face 14 and rear face 16. The open front face 14 of the camera housing 12 is normally closed by a lens mount 18 which consists of a flat lens mounting plate 18' having an aperture 20 for receiving and mounting a lens body assembly 22. The plate 18' is supported about its periphery within a dimensionally stable support frame 24 which is defined by four perpendicularly abutting members. The inner surfaces of the members of the support frame 24 are contiguous with and support an edge of the plate 18'. In the embodiment shown, the interior dimension of the support frame 24 is essentially equivalent to the outside dimension of the housing 12 and the open end of the housing 12 is received within the support frame 24 so that the lens mount 18 is slidingly carried by the camera housing 12. It will be understood that good results are obtained when the outside dimension of the support frame 24 is slightly less than the inside dimension of the housing 12 and the support frame 24 is slidingly received within the housing 12.

Figure 2:
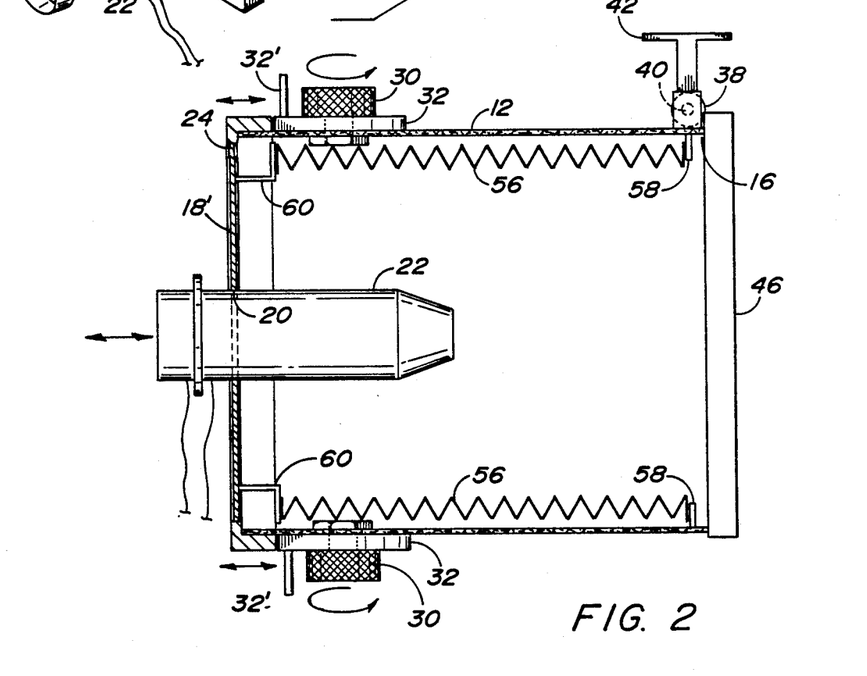
FIG. 2 is a side elevation, partially in section, of the camera of FIG. 1.
Figure 3:
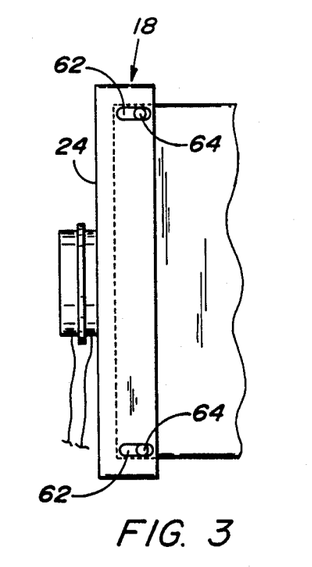
FIG. 3 is a side elevation, partially broken away for compactness of illustration, illustrating another method of focusing the camera lens.
Figure 4:
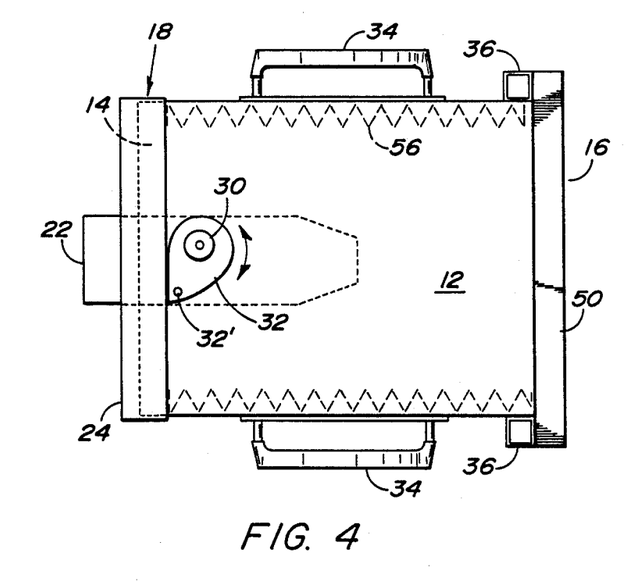
FIG. 4 is a top plan view of the camera of FIG. 1.

As is most clearly shown in FIG. 2 and 3, an eccentric disk cam 32 defining a camming surface 32' is rotatably disposed on the upper and lower sides of the camera housing 12 and a pin 32' is provided to serve as a handle for manual rotation of the cam 32. A knurled screw 30 is provided for each of the cams 32 for locking the cams 32. Springs 56 are disposed in the interior of the housing 12 to urge the lens mount 18 rearwardly on the camera housing 12 to maintain the rear face of the mounting frame 24 against the camming surface of the cams 32. The springs 56 are secured by pins 58 in the upper and lower walls of the camera housing 12 and by hooks 60 which are attached to the inner surface of the lens mounting plate 18'. The lens is focused by rotating the upper and lower cams 32 causing their camming surfaces to act against the rear face of the mounting frame 24 thus causing the lens mount 18 to slide outwardly against the urging of the springs to adjust the focal length of the lens for closer images. Once focused, the locking screw 30 is turned down to lock the cam 32 and prevent further rotation. The cam 32 may be provided with scribe marks to aid in positioning the cams 32 for the particular focusing distances.

In the embodiment of the invention where the lens mount 18 in slidingly disposed in the housing 12 a similar cam and spring combination is employed for lens focusing. However, in this embodiment the cams are located on the interior surfaces of the housing 12 but otherwise operate in the same fashion as the externally disposed cams 32. Where the cams are internally located it is preferred to provide an indicator with scribe marks on the exterior of the housing to indicate the position of the lens mount 18 in the housing 12.

It will be apparent from the foregoing description that very little travel of the lens is necessary to effect the focus of the lens for images ranging from infinity to as close in as five feet. For the sake of simplicity, only four positions need be considered to effect the aforementioned range of focusing. For example, a 135 mm lens is focused for infinity when the mounting frame 24 of the lens mount 18 is flush against the front edge of the camera housing 12. The lens mount 18 is moved forward about 0.12 inches to the lens 22 on images in the 20 foot range. For focusing images on the order of 13 feet the lens mount 18 is moved forward on the housing 12 about 0.2 inches and about 0.52 inches to focus the lens 22 for images on the order of 5 feet.

In a simpler embodiment, as illustrated in FIG. 3, the mounting frame 24 is provided with an elongated opening 62 adjacent the upper and lower corners on each side of the frame 24. A locking screw 64 is received in a threaded passage in the camera housing 12 at each corner thereof for locking the mounting frame 24 in a fully rearward position with the rear face of the lens mounting plate 18' contiguous with the front edge of the housing 12 and a second extended position about 0.12 inches away from the front edge of the housing 12. When mounted in this fashion the springs 56 are eliminated.

With the lens mount 18 in the full rearward position, the lens 22 is focused for infinity. When the lens mount 18 is moved into the extended position as limited by the elongated opening 62, the lens is focused for images at about 20 feet. Closer images, on the order of 13 feet, are focused by positioning the lens mount 18 in the rearward position and utilizing a 0.25 diopter lens in combination with the lens mounted in the camera. For even closer images, on the order of 8 feet, the lens mount 18 is moved to the forward position and the 0.25 diopter lens is utilized.

A handle 34 is located on each of the side surfaces of the camera housing 12. Square tubes 36 are disposed on the sides of the camera housing 12 and locking screws 38 are received in threaded passages 40 which communicate with the interior of each tube 36 for securing support members 42 which are telescopically received in the tubes 36. The upper telescoping members 42 provide support for a shoe for mounting flash attachments, a view finder and the like. The lower support members 42 act as legs for feet 44 which can be adjustably positioned between a fully retracted position as shown and an extended position.

Figure 5:
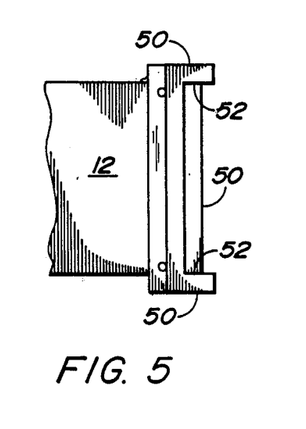
FIG. 5 is a side elevation, partially broken away for compactness of illustration, illustrating the rear portion of the camera body.
Figure 6:
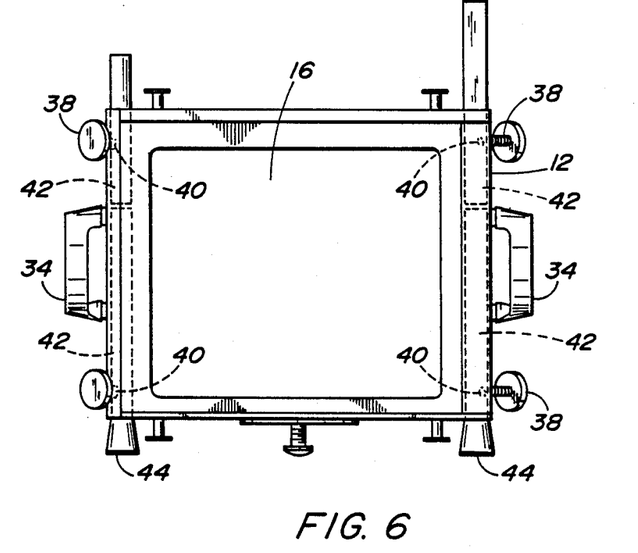
FIG. 6 is a rear elevation of the camera of FIG. 1.
Figure 7:
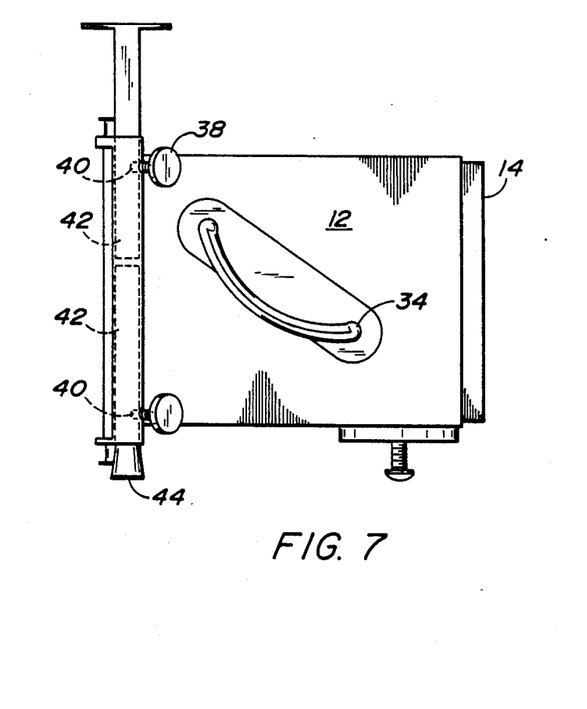
FIG. 7 is a side elevation of the camera of FIG. 1.

The rear face 16 of the camera housing 12 is adapted to removably receive a closure member 46 which may serve as a film holder or which can include a ground glass window for through the lens viewing. As is conventional in the art, the closure member 46, when utilized as a film holder, consists of a frame 48 which is slotted on one side for receiving a sheet of film and a light impermeable plate which normally protects the film from exposure during handling and the like. The closure member 46 may also be adapted to carry a film cassette and in such a case is provided with means for advancing the film from the cassette for exposure. As most clearly shown in FIG. 5, the camera housing 12 adjacent the open rear face 16 is provided with extended portions 50 at the top, bottom and one side edge to define a track 52 for slidably receiving the rear closure member 46. One side of the camera housing 12 is not extended so as to define an opening for insertion of the rear member 46. The opposite side of the camera housing 12, which is extended, defines a stop for limiting the travel of the rear member 46 when it is inserted in the track. Pins 54 are seated in the top and bottom edges of the camera housing 12 for retaining elastic members (not shown) to secure the rear member 46.

Figure 8:
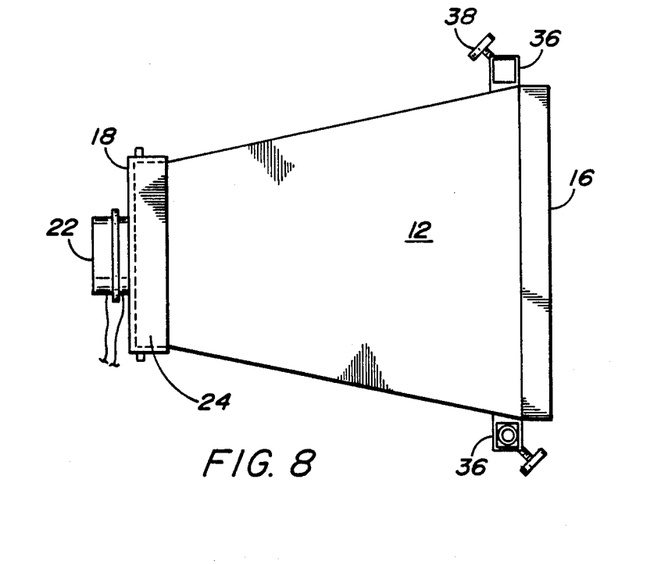
FIG. 8 is a top plan elevation of the camera of the present invention adapted for large film.
Figure 9:
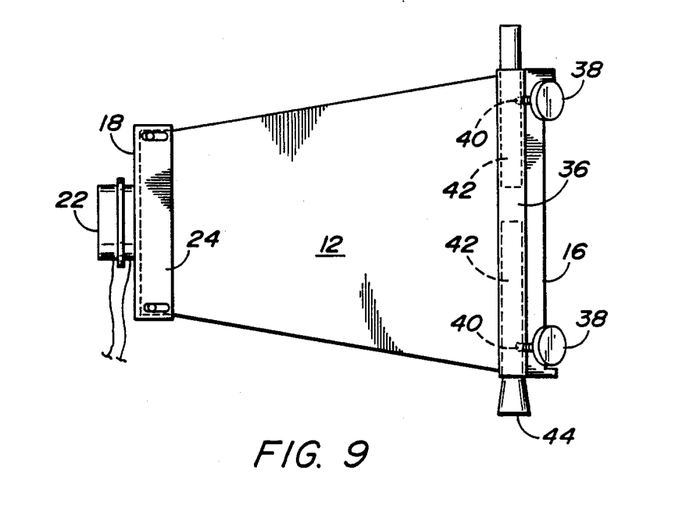
FIG. 9 is a side elevation of the camera illustrated in FIG. 8.

The dimensions of the housing 12 at the open rear face 16 determines the size of the film and film holder which can be received at the rear face 16 of the camera. Normally, the camera housing 12 is designed to receive as the rear member 46 a film holder adapted for 4"×5" sheets of film. However, it will be understood that the camera housing 12 can be manufactured to receive larger sheets of film such as, for example, 8"×10". To accomplish this, the length of the camera housing 12 from the lip to the rear surface remains the same, dependent upon the focal length of the lens for which the camera housing 12 is designed, but the rear portion of the camera housing 12 is flared so that the dimension of the rear face 16 of the camera housing 12 is large enough to receive the larger film holder. FIGS. 8 and 9 illustrate the plan view and side elevation of such a camera wherein like reference numbers denote like parts. As illustrated, the camera housing 12 extends rearwardly vertically and horizontally away from its longitudinal axis to define an enlarged rear face 16 adapted to receive a larger film holder which comprises the rear member 46 of the camera. Thus, the rear face 16 of the housing 12, which is normally 4"×5", can be adapted for 8"×10" film or even 9"×9" plates. The use of larger film size is highly advantageous for photogrammetric work where images are normally a long distance from the camera and the larger film size improves the accuracy of the photographic image.

As is well understood in the art, the distance from the rear of the lens to the inner surface of the back wall of the camera defined by the rear member 46 is dependent upon the focal length of the particular lens being employed in the camera. In the embodiment of the invention illustrated in FIGS. 1-5, the distance from the front edge of the housing 12 to the surface of the back wall is a critical distance dependent upon the design and focal length of the lens and the length of the housing 12 is determined by the specific lens to be used. Accordingly, the type of lens used in a given camera housing 12 may not be changed. However, the advantages of ruggedness, simplicity, and dimensional stability along with the capability to change lenses in the same camera housing are achieved by another embodiment of the invention as illustrated in FIG. 10 and FIG. 11.

Figure 10:
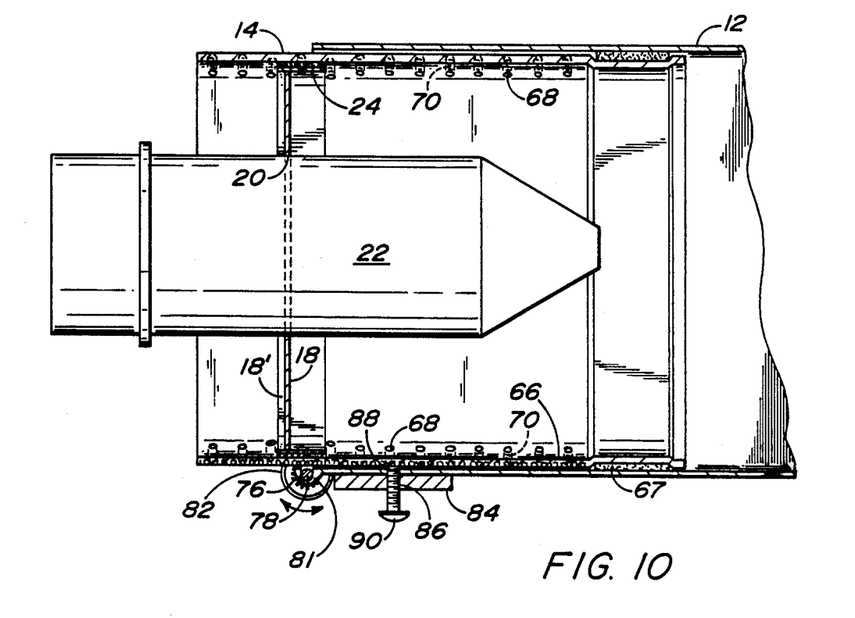
FIG. 10 is a side sectional view, partially broken away for compactness of illustration, illustrating a telescoping inner body within the housing of the camera of the present invention.
Figure 11:
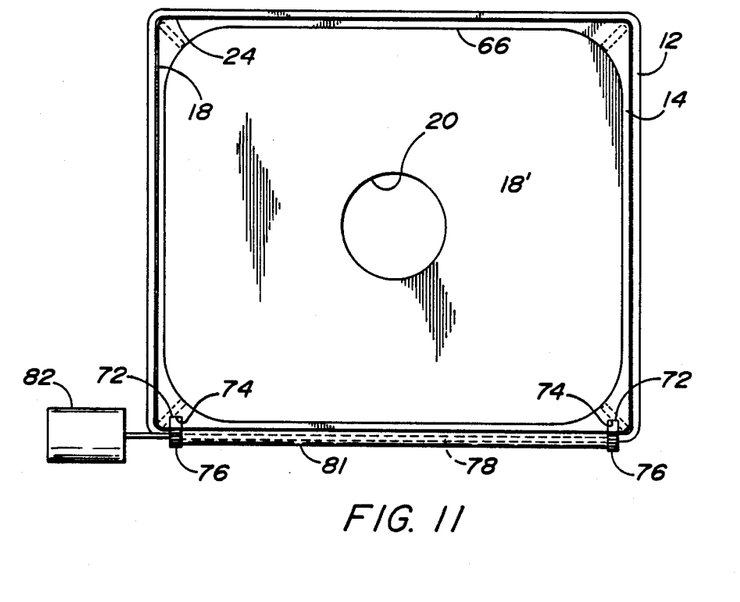
FIG. 11 is a front elevation of the camera of FIG. 10.
Figure 12:
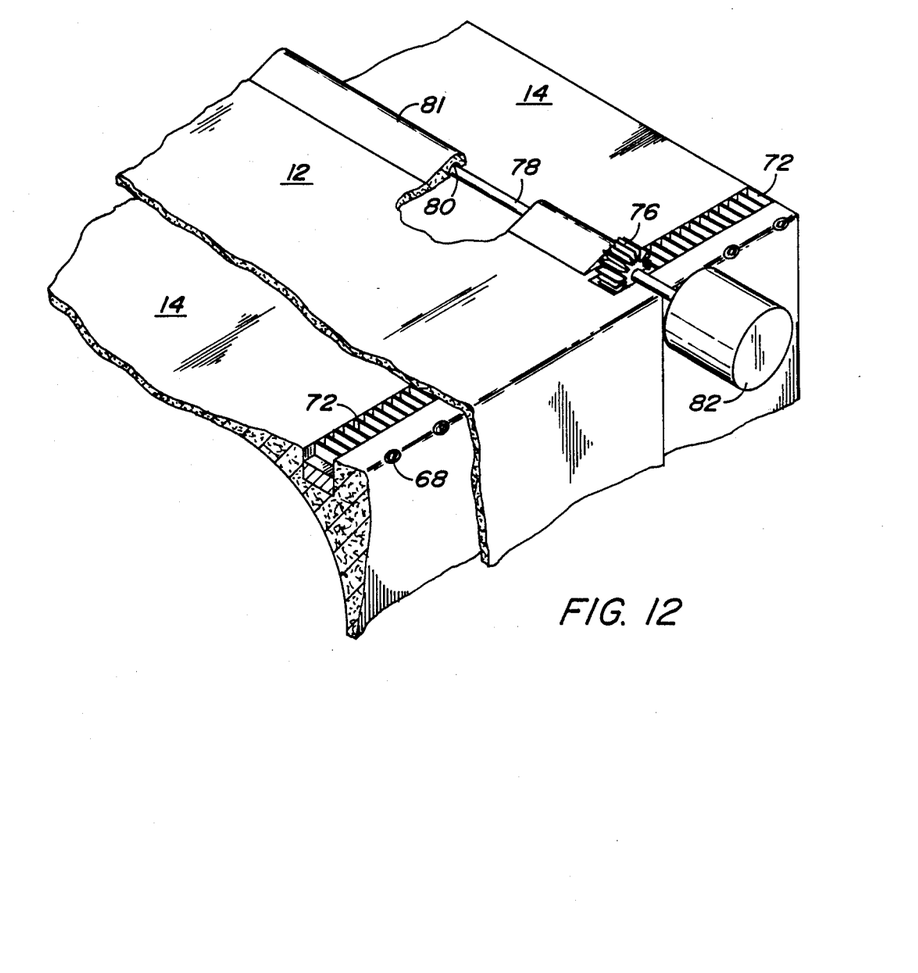

Referring to FIG. 10 and FIG. 11, wherein like reference numbers denote like parts, the camera housing 12 is constructed essentially as described for the camera housing 12 of FIG. 1. The camera housing 12 slidably receives an inner housing 66 of closely fitting shape and dimensions; preferably less than 0.010 inch overall tolerance between the housing and the inner housing 66 in the embodiment shown in FIG. 10. The inner housing 66 has a top and bottom wall and opposite side walls and is open ended. A light seal 67, preferably comprising a single wrap of compressible fabric, is disposed in a recess about the rear open end of the inner housing 66 and the fabric is compressed between the camera housing 12 and the walls of the inner housing 66. The fabric comprising the light seal 67 must be both compressible and be formed of a material which does not bind when the motion of the inner housing is reversed and for this purpose Velcro fabric is preferred.

The lens mount 18 is located in the interior of the inner housing 66 and is slidable in the inner housing 66 so that it may be positioned along the axis of the inner housing 66 to locate a lens the correct distance from the back wall of the camera housing 12, dependent upon the focal length of the lens. Once having determined the correct distance for the lens, the lens mount 18 is locked into position between set screws 68 which are positioned in through running, threaded passages 70 in the corners of the inner housing 66. To accommodate the threaded passages 70, the corner areas of the inner housing 66 are thickened as compared to the thickness of its top, bottom and side wall areas to eliminate material where it is not needed which effects a substantial saving in weight.

The inner housing 66 is slidably adjusted for focusing of the lens 22 by means of a pair of longitudinal racks 72 disposed in longitudinal grooves 74 in the bottom wall immediately adjacent the thickened corners of the inner housing 66. The longitudinal racks 72 are driven by a pair of pinion gears 76 which are distally secured on a rotatable shaft 78 received within an open arcuate channel 80 defined by a tubular member 81 that extends across the front lower edge of the camera housing 12. The rotatable shaft 78 is provided at one distal end with a focusing knob 82 which is affixed thereto for rotating the shaft 78 and the pinion gears 76. The pinion gears 76 engage the racks 72 such that the rotation of the pinion gears 76 advances or retracts the inner housing 66 relative to the camera housing 12. Locking means are provided to lock the inner housing 66 in a desired position to prevent movement of the lens 22 once it is focused. In the embodiment illustrated, the bottom wall of the camera housing 12 is reinforced with a plate 84 and a through running threaded passage 86 which is aligned with an opening 88 in the bottom wall of the camera housing 12. A lock bolt 90 is threadably received in the through running passage 86 of the plate 84 and the inner housing 66 is locked in position by turning down the lock bolt 90 so that the end of the lock bolt 90 clamps the bottom surface of the inner housing 66. It will be understood that the locking means may be located on any one or more walls of the inner housing 66.

As mentioned, the lens mounting assembly is removably positioned in the inner housing 66 and locked into position by the set screws 68. The corners of the inner housing 66 are provided with a plurality of the threaded passages 70 and a lens is readily exchanged for a different lens by backing out the set screws 68 to free the lens mount 18 so that it is readily removed from the interior of the inner housing 66. The lens 22 is exchanged in the lens mounting plate 18' and the lens mount 18 reinserted in the interior of the inner housing 66 and positioned along the axis a desired distance from the image receiving surface of the back wall dependent upon the focal length of the new lens 22. The set screws 68 are inserted in the passages 70 on either side of the lens mount 18 and are turned down to extend into the inner housing 66 and bracket the support frame 24 of the lens mount 18 at its new location thereby to lock it into position.

The dimensionally stable components of the camera illustrated in FIG. 1 and in FIG. 10 and FIG. 11, particularly the camera housing 12, the inner housing 66 and the mounting frame 24 for the lens mount 18, are formed of multiple layers of fiber reinforced plastic. Particularly good results are achieved using graphite fabric impregnated with epoxy resin. This material is very light weight and has extremely high strength. In addition, epoxy impregnated graphite fabric possesses excellent dimensional stability and minimal shrinkage which permits manufacturing of the parts in extremely close tolerances as required for photogrammetric purposes and for effective light sealing.

The dimensionally stable components are produced by applying several layers of the resin impregnated fabric over a core form which conforms to the inner configuration and dimensions of the component being formed and fitted to match the contours of the core. Reinforced areas, such as the thickened corners of the inner housing, have additional layers of material interleaved between the main assembly layers as requires to achieve the desired thickness for the finished component. The process is completed by enclosing the core assembly in a mold, the cavity of which conforms to the configuration and dimensions of the outer surface of the component being formed. The entire assembly is heated to at least the curing temperature of the resin, which in the case of epoxy impregnated graphite fabric, is in excess of 250° F. The inner surfaces of the components such as the housing 12 and the inner housing 66 are sprayed with a nonreflective black epoxy paint. Thus, for example, high strength housings are formed with a wall thickness of less than 1/16the of an inch with the corners of the inner housing 66, when utilized, thickened to about 5/16ths of an inch. The housing 12 weighs less than 1 pound for 4"×5" film and about 2 pounds for 8"×10" film without the film pack and optical elements. This is far less than any comparable conventional camera body utilized for photogrammetric work.

The invention has been described with reference to the illustrated and presently preferred embodiments. It is not intended that the invention be unduly limited by this disclosure of the preferred embodiment. Instead, it is intended that the invention be defined, by the means, and their obvious equivalents, set forth in the following claims.

What is claimed is:

1. A camera particularly adapted for photogrammetric use having:
    a. a dimensionally stable hollow body defining upper and lower walls and a two side walls and being open at two opposing sides;
    b. one said open side being adapted to removably attach means normally closing said one open side;
    c. a dimensionally stable lens mount for mounting a lens and shutter assembly normally closing said opposite open side, said lens mount being slidably disposed in said body;
    d. sealing means disposed in said body for a light seal between said body and said means normally closing said one open side and between said body and said lens mounting plate;
    e. means for locking said lens mounting plate in preselected positions in said body, said preselected positions corresponding to the focal length of said lens relative to object distance;
    whereby said lens mount retains said lens in an essentially absolute position with respect to said film holder and said body.

2. The camera of claim 1 wherein said lens mount comprises a flat, non-reflective, lens mounting plate having an aperture for receiving and mounting said lens and shutter assembly, said lens mounting plate surrounded by a dimensionally stable support frame, said support frame having surfaces adapted for sliding movement over surfaces of said body.

3. The camera of claim 2 wherein said support frame is defined by four perpendicularly abutted members, the width of each said member being greater than the thickness of said lens mounting plate thereby to define inner surfaces adapted for sliding movement on the exterior surfaces of said body, said support frame in plan being configured to slidably receive a portion of said body adjacent said opposite open end, said lens mounting plate and said support frame being slidably retained over said opposite open end of said body.

4. The camera of claim 2 wherein said support frame is configured to be slidably received in said body.

5. The camera of claim 2 wherein said support frame comprises a tubular sleeve in which is disposed said lens mounting plate, said tubular sleeve being telescopically disposed within said body for sliding movement therein thereby to adjust the focal length of a lens in said lens mounting plate dependent upon object distance.

6. The camera of claim 5 further including an arcuate channel extending across an edge of said body at said opposite open end, a shaft rotatably received in said channel and having at least one pinion gear fixed distally thereon, at least one longitudinal rack on the undersurface of said tubular sleeve engaged by said pinion gear.

7. The camera of claim 3 further including at least one eccentric disk cam rotatably journaled on an exterior surface of said body, the circumferential surface of said eccentric cam defining a camming surface in contact with a rear facing surface of said support frame, spring means for urging said support frame against said camming surface whereby rotation of said cam causes said camming surface to act against said support frame causing said support frame to slide axially inwardly and outwardly responsive to the urging of said camming surface and said spring means.

8. The camera of claim 7 further including means for locking said cams to prevent rotation thereof.

9. The camera of claim 7 wherein said spring means comprise coil springs disposed in the interior of said housing adjacent said upper and lower walls, said springs being secured to said upper and lower walls and to said lens plate of said lens mounting plate assembly, said springs being normally compressed to urge said lens mounting assembly rearwardly on said camera housing thereby to maintain a rear surface of said mounting frame against the camming surface of said cams.

10. The camera of claim 4 further including at least one eccentric disk cam rotatably journaled on an interior surface of said body, the circumferential surface of said eccentric cam defining a camming surface in contact with a rear facing surface of said support frame, spring means for urging said support frame against said camming surface whereby rotation of said cam causes said camming surface to act against said support frame causing said support frame to slide axially inwardly and outwardly responsive to the urging of said camming surface and said spring means.

11. The camera of claim 10 wherein said spring means comprise coil springs disposed in the interior of said housing adjacent said upper and lower walls, said springs being secured to said upper and lower walls and to said lens mounting plate assembly, said springs being normally compressed to urge said lens mounting assembly rearwardly on said camera housing thereby to maintain a rear surface of said mounting frame against the camming surface of said cams.

12. The camera of claim 3 wherein said mounting frame is provided with an elongated opening adjacent the upper and lower corners on each side thereof, said elongated opening communicating with a corresponding threaded passage in said housing and a locking screw extending through said elongated opening and received in said threaded passage for locking said lens mounting plate assembly in a fully rearward position with the rear face of said lens mounting plate contiguous with a front edge of said housing and an extended position with the rear face of said lens mounting plate spaced away from said front edge of said housing, the length of said elongated opening limiting the travel of said lens mounting plate assembly and being selected so that said lens is focused for images closer than infinity when said lens mounting plate assembly is in the extended position.

13. The camera of claim 1 wherein said upper, lower and one side wall adjacent said one open side of said body are extended whereby the extensions of said upper and lower walls define a track for said means closing said one open side and said extension of said side wall defines a stop for limiting the travel of said closure means.

14. The camera of claim wherein said body extends rearwardly vertically and horizontally away from its longitudinal axis to define an enlarged rear face.

15. The camera of claim 1 wherein said dimensionally stable body is formed of fiber reinforced plastic.

16. The camera of claim 15 wherein said fiber reinforced plastic consists of epoxy impregnated graphite fabric.

17. The camera of claim 15 wherein said body comprises at least one layer of epoxy impregnated graphite fabric.

18. The camera of claim 1 including:
 a. first and second square tubular posts carried on the opposite sides of said first housing, adjacent its rear end; and
 b. first and second legs, one each telescopingly received in each of said tubular posts.

19. The camera of claim 18 including:
 a. upper and lower corner bores extending through corners of said tubular posts; and
 b. thumb wheels fixedly carried on shafts threadably received in said corner bores to fixedly secure said legs.

20. A camera having:
 a. a tubular body formed with a first, outer housing, and a second housing telescopingly received therein;
 b. a continuous band of fabric received about said extendible housing adjacent its end received within said first housing;
 c. a lens mounting plate having an aperture to receive a lens slidably received within said second housing
 d. a rectangular sleeve also slidably received within said second housing to form a light seal;
 e. a second continuous band of fabric received about said rectangular sleeve;
 f. a plurality of stop means spaced apart in a longitudinal array on the inside walls of said second, extendible housing and located at positions to provide abutment stops for location of said lens mounting plate and light seal at preselected positions corresponding to the focal length of the lens received on said lens mounting plate.

21. The camera of claim 20 wherein said first and second housings are rectangular in cross-section.

22. The camera of claim 20 wherein said housings are formed of fiber reinforced plastic.

23. The camera of claim 20 wherein said fiber reinforced plastic is carbon fiber reinforced epoxy resin.

24. The camera of claim 20 including:
 a. an open, arcuate channel extending across the bottom front edge of said first, outer housing;
 b. a shaft fixedly distally supporting pinion gears rotatably received within said channel; and
 c. a pair of longitudinal racks on the undersurface of said second, telescoping housing engaged by said pinon gears.

25. The camera of claim 20 wherein said stop means comprise:
 a. a plurality of internally threaded bores through said second housing and longitudinally arrayed along each corner thereof; and
 b. a like plurality of set screws threadably received in each of said bores, and extending into the interior of said second housing to provide said abutment stops.

26. The camera of claim 20 including:

a. a film back comprising a flat mounting plate with a film aperture; and b. releasable means securing said film back tightly against the rear face of said first housing.

27. The camera of claim 26 wherein said releasable means comprises resilient band means carried at the rear of said first outer housing and extending about said film back to secure said film pack to the rear face of said housing.

* * * * *

UNITED STATES PATENT AND TRADEMARK OFFICE
CERTIFICATE OF CORRECTION

PATENT NO. : 4,835,559
DATED : May 30, 1989
INVENTOR(S) : Mark Hattan

It is certified that error appears in the above-identified patent and that said Letters Patent is hereby corrected as shown below:

Claim 14, column 10, line 5, after "claim" insert --1--

Signed and Sealed this

Sixth Day of February, 1990

Attest:

JEFFREY M. SAMUELS

*Attesting Officer*        *Acting Commissioner of Patents and Trademarks*